United States Patent [19]
Bruer et al.

[11] Patent Number: 4,928,460
[45] Date of Patent: May 29, 1990

[54] SELF-PROPELLING FIELD CHOPPING MACHINE

[75] Inventors: Dirk Bruer; Franz Heidjann; Heinrich Hemker, all of Harsewinkel, Fed. Rep. of Germany

[73] Assignee: Claas OHG, Harsewinkel, Fed. Rep. of Germany

[21] Appl. No.: 187,947

[22] Filed: Apr. 29, 1988

Related U.S. Application Data

[63] Continuation-in-part of Ser. No. 888,793, Jul. 21, 1986, abandoned.

[30] Foreign Application Priority Data

Sep. 21, 1985 [DE] Fed. Rep. of Germany ....... 3533773

[51] Int. Cl.[5] .................... A01D 41/02; A01F 12/60
[52] U.S. Cl. ...................................... 56/14.6; 460/77; 460/81; 56/14.7
[58] Field of Search ............... 56/14.3, 14.5, 14.6, 56/14.7, 16.5, 16.6; 130/27 R, 27 AB, 24, 25, 26, 22 R; 180/900

[56] References Cited

U.S. PATENT DOCUMENTS

| | | | |
|---|---|---|---|
| 2,888,088 | 5/1959 | Claas et al. | 56/14.7 |
| 3,487,926 | 1/1970 | Brister | 130/24 |
| 3,680,291 | 8/1972 | Soteropulos | 56/14.6 |
| 3,757,797 | 9/1973 | Mathews | 130/26 |
| 3,940,911 | 3/1976 | Schmitt | 130/27 R |
| 4,317,326 | 3/1982 | Riedinger | 56/14.6 |
| 4,428,182 | 1/1984 | Allen et al. | 56/14.6 |

FOREIGN PATENT DOCUMENTS

| | | | |
|---|---|---|---|
| 3125659 | 1/1983 | Fed. Rep. of Germany | 130/27 R |
| 1448089 | 2/1969 | France | 180/900 |
| 1220580 | 3/1986 | U.S.S.R. | 56/14.3 |

Primary Examiner—John Weiss
Attorney, Agent, or Firm—Michael J. Striker

[57] ABSTRACT

A self-propelling field chopping machine comprises a chassis, a front cutting mechanism, a transporting channel provided with a throwing out pipe having a downstream end, a rotatable conveyor arranged upstream of the transporting channel and formed as a rotatable conveyor drum provided with paddels, a threshing device arranged between the cutting mechanism and the rotatable conveyor drum and operating in accordance with an axial flow system, a wind sieve device located at the end of the throwing pipe so that a grain-chaff mixture without straw is supplied to the wind sieve device, and a grain tank located under the wind sieve device.

10 Claims, 3 Drawing Sheets ial
SELF-PROPELLING FIELD CHOPPING MACHINE

CROSS-REFERENCE TO A RELATED APPLICATION

This application is a continuation-in-part of application Ser. No. 888,793, filed on July 21, 1986 abandoned 9/22/88.

BACKGROUND OF THE INVENTION

The present invention relates to a self-propelling field chopping machine.

More particularly, it relates to such a self-propelling field chopping machine which has a chassis, a machine housing, a front cutting mechanism, transporting elements arranged downstream of the front cutting mechanism, a rotatable chopper-cutter drum, a transporting channel which follows the chopper-cutter drum, and a throwing out pipe. Field chopping machines of the above-mentioned general type are known in the art. For obtaining high throughputs, these fields chopping machines are designed so that they are bigger and more powerful. On the one hand, such tendency is desirable. On the other hand, the provision of such modern field chopping machines especially for farmers, requires high investments, while such aggregates can be used during a year for a maximum of only several weeks. Thus, it is believed to be clear that such machines possess some disadvantages which can be eliminated.

SUMMARY OF THE INVENTION

Accordingly, it is an object of the present invention to provide a field chopping machine which avoids the disadvantages of the prior art.

More particularly, it is an object of the present invention to provide a self-propelling field chopping machine which has an expanded area of application, so that its profitability can be considerably increased.

In keeping with these objects and with others which will become apparent hereinafter, one feature of the present invention resides, briefly stated, in a self-propelling field chopping machine in which, instead of a rotatable chopper-cutter drum, a rotatable throwing conveyor drum is provided, and a threshing device is arranged between a cutting mechanism and the throwing conveyor drum, and the grain-chaff mixture without straw is supplied to a wind sieve device arranged at the end of the throwing out pipe, while a grain tank is located under the wind sieve device.

When a field chopping machine is designed in accordance with the present invention only little conversion works are needed to use it as a harvester thresher. Therefore the above-described disadvantages are eliminated and the objects of the present invention are attained.

The novel features which are considered as chracteristic for the invention are set forth in particular in the appended claims. Theinvention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
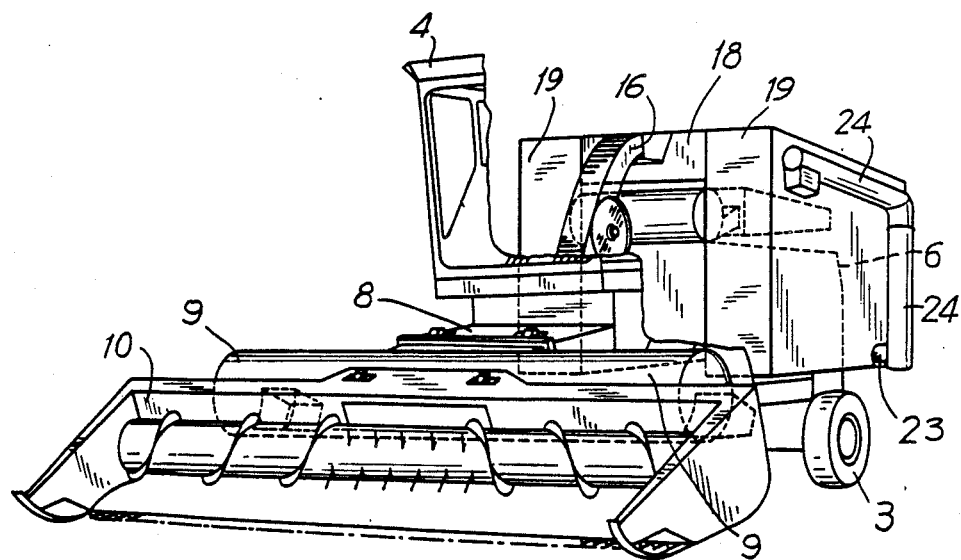
FIG. 1 is a perspective view of a field chopping machine in accordance with the present invention.

A field chopping machine in accordance with the present invention is identified as a whole with reference numeral 1. The field chopping machine has front driving wheels 2 and rear steering wheels 3. A driver's cabin of the field chopping machine is identified with reference numeral 4. A driving aggregate of the inventive machine is identified with reference numeral 5 and accommodated in a housing 6. The field chopping machine has a machine frame identified with reference numeral 7.

An inclined conveyor 8 is arranged in the region between the driving wheels 2 and connected with the machine frame 7. The inclined conveyor 8 has a front end as considered in a traveling direction. An axial threshing and separating unit 9 is suspended on the front end of the inclined conveyor 8. The axial threshing and separating unit operates in accordance with the principle of axial flow threshing and has a conventional construction, such as the axial threshing and separating unit disclosed in the U.S. patent application Ser. No. 389,232 or the U.S. Pat. No. 4,663,921. In general, the axial threshing and separating unit receives a product, then transport it axially and discharges through one or two axial ends. A cutting mechanism 10 is arranged on the threshing and separating unit 9 and particularly at its end which faces the inclined conveyor 8.

The cutting mechanism 10, the threshing and separating unit 9, and the inclined conveyor 8 together form a unit which can be turned for the purpose of adjusting the cutting height. This turning is performed in a known manner by means of hydraulic cylinder-piston units 11.

As can be seen from FIG. 1, instead of conventionally used chopper-cutter drum, a throwing conveyor drum 13 provided with paddels and the like is located in the region of transition from the inclined conveyor 8 to a transporting channel 12. The throwing conveyor drum 13 throws a grain-chaff mixture transported by transporting elements 14 upwardly to a centrifugal wheel 15. The centrifugal wheel 15 in turn catapults the grain-chaff mixture through a throwing out pipe 16 to a known wind sieve device 17.

In accordance with the embodiment of FIG. 1, a housing 18 wich supports the individual elements of the wind sieve device 17 is arranged from above on the housing 6 and connected with two grain tanks 19 suspended laterally near the housing 6. The housing 18 which carries the wind sieve device 17 and the grain tanks 19 connected with it, together form a saddle which sits on the housing 6. Each tank 19 has a discharge screw 22 which can transport the product from each tank 19 to a transverse screw 23. Then the cleaned grain is transported from the transverse screw 23 via an unloading screw 24.

Figure 2:
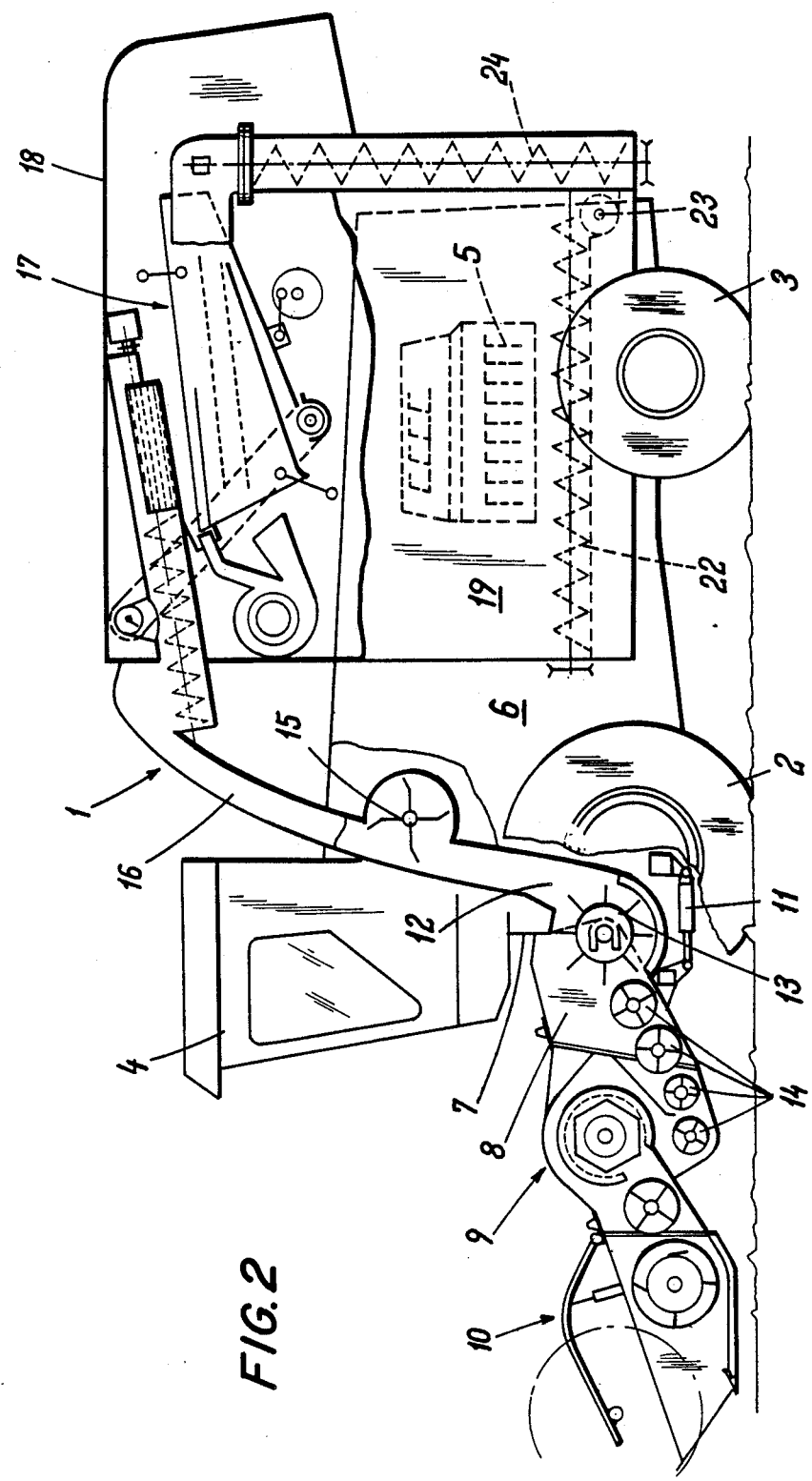
FIG. 2 is a side view of the inventive field chopping machine of FIG. 1.

The machine shownin FIGS. 1 and 2 can be easily converted. For this purpose the saddle which includes the housing 18 carrying the wind sieve device 17 and the grain tanks 19 is removed, the axial threshing and separating unit 9 is also removed, and the throwing conveyor drum 13 is replaced by the chopper-cutter drum. It is believed that the conversion is performed in a very simple manner. For the purpose of this conversion, the respective units of the machine are mounted in an easily removable way. It is believed to be clear that respective mounting elements for removal mounting of the units are well known in the art and it is not necessary to describe them in detail. For example, the units 8, 9, 10 are connected with one another by quick couplings. The throwing conveyor drum 13 or the chopper-cutter drum are mounted by supporting of their axial ends in U-shaped brackets of the machine frame. Also other alternatives of removable mounting of the above specified removable units are possible.

Figure 3:
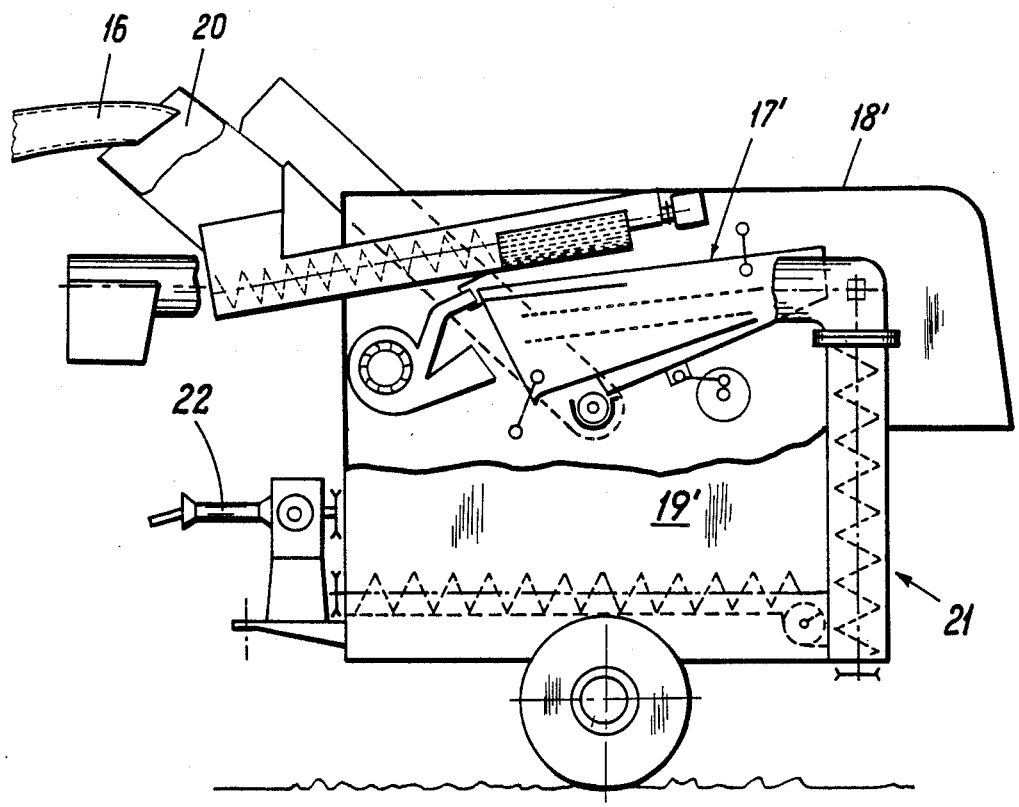
FIG. 3 is a side view showing another embodiment of the field chopping machine in accordance with the present invention.

In another embodiment of the invention shown in FIG. 3, the grain-chaff mixture from the throwing pipe 16 is a supplied via a funnel 20 to a wind sieve device 17'. The housing 18' of the wind sieve device 17' forms an upper part of a loading carriage 21. The lower part of the loading carriage 21 forms a grain tank 19'. The loading carriage 21 which is formed in this manner, can be suspended on the field chopping machine and uncoupled from it in a very fast manner. The individual elements of the wind sieve device 17' and the screws associated with the grain tank are driven via a power take-off 22a connectable with the field chopping machine.

It will be understood that each of the elements described above, or two or more together, may also find a useful application in other types of constructions differing from the types described above.

While the invention has been illustrated and described as embodied in a self-propelling field chopping machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-propelling field chopping machine, comprising a chassis; a front cutting mechanism; a transporting channel provided with a throwing out pipe having a downstream end; a rotatable conveyor arranged upstream of said transporting channel and formed as a rotatable conveyor drum provided with paddles; a threshing device arranged between said cutting mechanism and said rotatable conveyor drum and operating in accordance with an axial flow system; a wind sieve device located at said end of said throwing out pipe so that a grain-chaff mixture without straw is supplied to said wind sieve device; and a grain tank located under said wind sieve device and removably mounted on said chassis so that with said grain tank the self-propelling field chopping machine can be used as a self-propelling harvester thresher and without said grain tank it can be used as the self-propelling chopping machine.

2. A field chopping machine as defined in claim 1; and further comprising drive means; a main housing accommodating said drive means, said wind sieve device having a wind sieve housing which is arranged on said main housing from above.

3. A field chopping machine as defined in claim 1; and further comprising a machine unit; and a loading carriage connectable with said machine unit, said wind sieve device arranged at said end of said throwing pipe and said grain tank arranged under said wind sieve device forming parts of said loading carriage.

4. A field chopping machine as defined in claim 3; and further comprising a power take-off arranged to connect said wind sieve device with said machine unit.

5. A self-propelling field chopping machine, comprising a chassis; a front cutting mechanism; a transporting channel provided with a throwing out pipe having a downstream end; a rotatable conveyor arranged upstream of said transporting channel and formed as a rotatable conveyor drum provided with paddles; a threshing device arranged between said cutting mechanism and said rotatable conveyor drum and operating in accordance with an axial flow system; a wind sieve device located at said end of said throwing out pipe so that a grain-chaff mixture without straw is supplied to said wind sieve device; a grain tank located under said wind sieve device; drive means; a main housing accommodating said drive means, said wind sieve device having a wind sieve housing which is arranged on said main housing from above; and a second such grain tank, said grain tanks being arranged on both sides of said wind sieve housing and connected with the latter, said wind sieve housing and said grain tanks together forming a saddle which is removably arranged on said main housing of said drive means.

6. A field chopping machine as defined in claim 5, wherein each of said grain tanks has a bottom region and is provided at said bottom region with a transporting member; and further comprising a transverse transporting member which connects said transporting members with said grain tanks with one another so as to transport a cleaned grain from the latter.

7. A field chopping machine as defined in claim 6; and further comprising an unloading transporting member arranged downstream of said transverse transporting member so that the cleaned grain is transported by said transverse transporting member to said unloading transporting member.

8. A field chopping machine as defined in claim 6, wherein said transporting members are formed as conveyor screws.

9. A field chopping machine as defined in claim 7, wherein said transporting members and said unloading transporting member are formed as conveyor screws.

10. A field chopping machine as defined in claim 9; and further comprising a power take-off connectable with said screws.

* * * * *